United States Patent [19]

Blackler

[11] Patent Number: 4,792,673
[45] Date of Patent: Dec. 20, 1988

[54] GRATICULE ILLUMINATOR FOR AN IMAGE INTENSIFIER

[75] Inventor: Francis G. Blackler, Dorchester, England

[73] Assignee: U.S. Philips Corporation, New York, N.Y.

[21] Appl. No.: 142,080

[22] Filed: Oct. 3, 1986

Related U.S. Application Data

[63] Continuation of Ser. No. 639,974, Aug. 10, 1984.

[30] Foreign Application Priority Data

Aug. 10, 1983 [GB] United Kingdom ............... 8321484

[51] Int. Cl.$^4$ ..................... H01J 31/50; F41G 1/32
[52] U.S. Cl. ................... 250/213 VT; 33/241
[58] Field of Search .............. 250/213 VT, 231 R; 33/241, 243, 245, 246; 356/247; 350/562; 42/15, 15 T; 89/41 E

[56] References Cited

U.S. PATENT DOCUMENTS 3,974,585 8/1976 Dunham ................... 33/241
4,214,371 6/1980 Bush ....................... 33/241

FOREIGN PATENT DOCUMENTS 2090012 12/1980 United Kingdom .

Primary Examiner—David C. Nelms
Assistant Examiner—William L. Oen
Attorney, Agent, or Firm—F. Brice Faller

[57] ABSTRACT

A night sight provided with an image intensifier may have an externally mounted graticule for aiming. It is known to provide a graticule illumination system for a graticule injected onto the phosphor screen of the intensifier which renders the graticule visible in a color, red for example, which is distinctive from the phosphor color, usually green. The phosphor brightness varies considerably with changes in scene illumination and hitherto it has been found essential to vary the graticule brightness accordingly to maintain graticule visibility without obscuring target details with graticule glare. A graticule in accordance with the invention comprises a light diffusing pattern (13) on one surface of a transparent plate, said surface being effectively in contact with the phosphor screen (11). The graticule is illuminated (19,20) at a predetermined brightness above the screen brightness obtained when the intensifier is used to observe a scene illuminated by overcast starlight but below that of the screen brightness obtained when the intensifier is used to observe a scene illuminated by moonlight. The graticule pattern appears in red when observing very low brightness scenes but appears as a black pattern when observing relatively high brightness scenes.

7 Claims, 1 Drawing Sheet

GRATICULE ILLUMINATOR FOR AN IMAGE INTENSIFIER

This is a continuation of application Ser. No. 639,974, filed Aug. 10, 1984, now abandoned.

BACKGROUND OF THE INVENTION

This invention relates to a graticule illumination system for use with a night sight including an image intensifier. More particularly, it relates to a graticule illumination system for use with an image intensifier having a phosphor screen on which an intensified output image is displayed in a first colour characteristic of the phosphor. The illumination system comprises means for superimposing a graticule image effectively onto the phosphor screen and for illuminating the graticule with light of a second colour contrasting with the first colour.

Such a graticule illumination system is described in British patent application No. 2,090,012A in which an eye piece magnifying lens system used to view the phosphor screen includes a semi-reflective layer at an angle of 45 degrees to the eye piece axis and arranged to present a virtual image of an illuminated graticule in coincidence with the phosphor screen. If the graticule illumination is removed, the graticule disappears altogether. Also, to maintain adequate visibility of the graticule throughout the range of phosphor screen brightness obtained when observing scenes illuminated with overcast starlight up to moonlight, the graticule illumination must be adjusted by the user to suit the current screen brightness. Care is required in making this adjustment to ensure visibility of the graticule at high definition without introducing glare which might obscure target details. Under battlefield conditions there may not be time to set the graticule brightness to a value suited to the brightness of the target momentarily being observed.

Alternatively, an opaque graticule pattern may be used effectively in coincidence with the phosphor screen. At high scene brightnesses, and hence high screen brightness, the graticule will be visible as a black pattern, much as in a conventional telescopic sight. However at low screen brightnesses the visibility of the graticule declines and eventually becomes unuseable at the lowest scene brightnesses.

SUMMARY OF THE INVENTION

It is an object of the invention to provide a graticule illumination system in which a single initial adjustment of graticule brightness will suffice for a range of target brightnesses likely to be encountered during operational conditions.

The invention provides a graticule illumination system for use with an intensifying night sight, which system comprises an image intensifier tube having a phosphor screen on which an intensified output image is displayed in a first colour characteristic of the phosphor, a graticule for superimposing a graticule image on the output image, and means for illuminating the graticule with light of a second colour contrasting with the first colour. The graticule comprises a light diffusing pattern on a transparent plate, which pattern intercepts the light of the output image, the graticule illumination means producing a predetermined brightness of the pattern above the output image brightness obtained when the sight is used to observe scenes having a very low brightness, but below that of the output image brightness obtained when the sight is used to observe scenes having a relatively high brightness. The graticule pattern appears in the second colour when observing very low brightness scenes but appears as a black pattern when observing relatively high brightness scenes.

Herein very low brightness is defined as being typically that of overcast starlight and relatively high brightness as being that of moonlight.

Various types of image intensifier tube may be used. If a type is used which has a simple glass output window with the phosphor screen on the inside surface of this window, a relay lens may be interposed between the phosphor screen and the transparent plate to form a real image of the output image upon the graticule pattern.

With other tubes a system in accordance with the invention may be characterised in that said image intensifier tube comprises a fibre optic output window with the phosphor screen being deposited upon the inside vacuum surface of said window. The surface of the transparent plate bearing the graticule pattern is separated from the outside surface of the window by a gap of uniform width large enough to preclude optical contact between the plate and the window but small enough to substantially preclude parallax between the output image and the graticule. Such a system enables a compact eyepiece magnifier to be provided.

The light diffusing pattern may be illuminated from outside the transparent plate. However, a system in accordance with the invention may comprise means for injecting light of the second colour into the transparent plate at the edge of the plate so that the light spreads inside the plate by repeated total internal reflection at the plate surfaces and is scattered out of the plate by the pattern.

BRIEF DESCRIPTION OF THE DRAWING

An embodiment of the invention will now be described, by way of example, with reference to the accompanying drawings, in which.

DESCRIPTION OF THE PREFERRED EMBODIMENT

Figure 1:
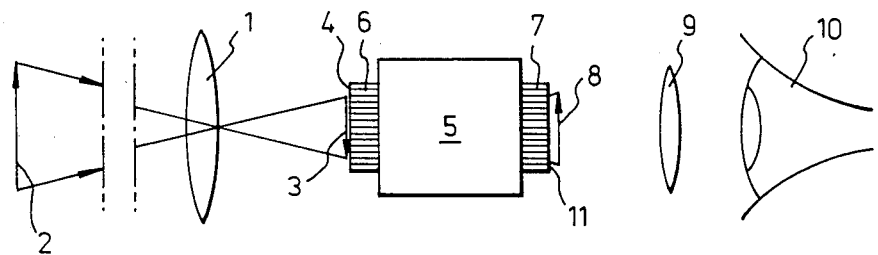
FIG. 1 shows the optical and electronic components of an image intensifier sight to which the invention may be applied.

Referring to FIG. 1 the main components of a night sight, or image intensifier sight, are shown schematically. An objective lens 1 forms an inverted real image 3 of a distant object 2 on the input face 4 of an image intensifier tube 5. The intensifier tube 5 comprises an input fibre optic window 6, the inside vacuum face of which is concave towards the tube center and carries an evaporated photocathode. The tube 5 comprises, in sequence from the photocathode 6, an electron optical image inverter, a channel plate electron multiplier and a phosphor screen, none of which are shown in FIG. 1 since they are not relevant to the invention. The phosphor screen is deposited upon the inside vacuum surface of a fibre optic output window 7. The intensifier tube 5 may be a Philips type XX1501 and will not be described further than to say that the input window 6 transfers the input image 3 to the photocathode without significant degradation and that the output window 7 transfers the image of the phosphor screen bearing the erect and intensified image 8 to the outside surface 11 of window 7 also without significant degradation. An eyepiece magnifier lens 9 provides the observer's eye 10 with an erect magnified virtual image of the screen at a comfortable viewing distance of approximately 50 cm. Thus the phosphor screen is effectively present on the outside surface 11 of window 7.

Figure 2:
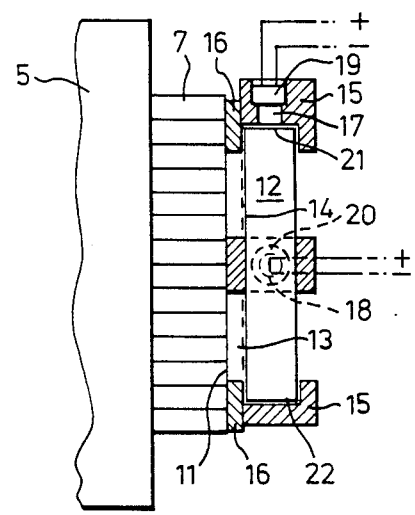
FIG. 2 shows, partly in section, a graticule illumination system as applied to the sight of FIG. 1.

FIG. 2 shows a graticule illumination system applied to image output surface 11 of window 7 of FIG. 1. A transparent plate 12 carries the graticule 13 as a light diffusing pattern etched into the surface 14 of plate 12. More specifically, the graticule 13 may be of an etched and filled type well-known in the art. The graticule pattern is first etched into the surface 14; the grooves formed are then filled with material (e.g. glass beads) capable of transmitting light. A graticule holder 15, shown in section, holds plate 12 against a spacer 16 which in turn bears on surface 11. The spacer is typically 50 microns thick, ensuring that there is virtually no parallax effect between the surface 11 and the graticule 13. All faces of plate 12 are polished to provide a high level of total internal reflection at all faces. Apertures 17 and 18 are provided in holder 15 to receive light emitting diodes 19 and 20. The inside surfaces of apertures 17 and 18 are polished to assist in transferring light from the diodes to the edges of plate 12. The edges 21 and 22 may be metallised, except opposite apertures 17 and 18, to retain the maximum amount of light within the plate. The two apertures 17 and 18 are on edges of plate 12 which are transverse to one another to ensure that both vertical and horizontal lines on the graticule pattern are equally illuminated. The holder 15 may be displaceable horizontally and vertically relative to the surface 11 to allow the graticule to be aligned with an aiming axis when the sight is attached to a weapon such as a rifle.

Light entering the plate 12 from the diodes 19 and 20 effectively fills the interior of the plate 12 as a result of multiple total internal reflection. Light escapes from the plate 12 almost entirely via the etched graticule 13 at which diffusion of light occurs, rendering the graticule visible. This is because the parallel sided gap between the plate 12 and the surface 11 provided by the spacer 16, although small, is large enough to prevent optical contact between them. Otherwise with too small a gap, of the order of half a wavelength or less, total internal reflection would be frustrated and diode light would be fed into the fibre optic face plate 7, illuminating the phosphor. In practice, the gap, 50 microns, is large enough to preclude faceplate and graticule scratching by dust or grit particles between them when the graticule is moved for alignment, for example. It is also large enough to prevent interference fringes generated between the two flat optical surfaces from being visible by reason of the superposition of fringe patterns of a range of fringe pitches.

The phosphor will typically emit a green colour while the light emitting diodes provide a contrasting second colour, red. Provided the graticule brightness is comparable with or greater than the phosphor brightness, the graticule will appear as a red pattern against a green field. However, if the graticule brightness is low compared to the phosphor brightness, the dominant effect will be that of phosphor light scattering by the etched graticule pattern which will then appear effectively black against a green field. As the phosphor brightness changes from low to high values, the graticule changes in colour from red to dark red to black and remains distinctive against the green field for all phosphor brightnesses.

At the start of night operations, the sight could be aimed at an area of very low brightness, under trees in a wooded area for example. The graticule brightness could then be adjusted by varying the diode currents, via a pre-set control not shown, so that the graticule is red and sharply visible with the lowest values of diode currents. Thereafter the sight can be aimed at scenes of all brightnesses without adjustment of graticule brightness and the graticule will always be visible. But for preference, the graticule brightness is preset by the manufacturer, removing the brightness control from the sight and so simplifying the sight for the user.

The scene illuminations encountered range from 0.1 millilux in overcast starlight to 100 millilux in moonlight, a range of 1000 to 1. Practical image intensifiers, for example Philips type XX1501, usually incorporate an automatic brightness control (ABC) circuit which limits the range of phosphor screen brightness which the observer will experience. Such ABC circuits are usually arranged so that in overcast starlight the intensifier operates at maximum gain and remains at maximum gain for a scene brightness increase by a factor of 10 or so, corresponding to starlight or 1.0 millilux. Thereafter, as the scene grows still brighter, the ABC circuit comes into operation and reduces the intensifier gain so as to maintain the phosphor screen overall brightness substantially constant. In a graticule illumination system in accordance with the invention, the graticule brightness would be set to equal the screen brightness at a point mid-way in the region of maximum intensifier gain.

I claim:

1. In a graticule illumination system for use with an intensifying night sight, said system including the combination of an image intensifier tube having a phosphor screen on which an intensified output image is displayed in a first color characteristic of the phosphor, a graticule for superimposing a graticule image on said output image, and means for illuminating said graticule with light of a second color contrasting with the first color, the improvement therein comprising said graticule having a light diffusing pattern on a transparent plate, said pattern intercepting the light of said output image, and said graticule illumination means producing a predetermined brightness of said pattern greater than the output image brightness obtained when the sight is used to observe scenes having a first level of brightness, and less than the output image brightness obtained when the sight is used to observe scenes having a second level of brightness, the brightness of said second level being greater than the brightness of said first level, said graticule pattern appearing in said second color when observing first level brightness scenes but appearing as a black pattern when observing second level scenes.

2. A graticule illumination system as claimed in claim 1, and further comprising a relay lens interposed between said phosphor screen and said transparent plate to form a real image of said output image upon said graticule pattern.

3. A graticule illumination system as claimed in claim 1, wherein said image intensifier tube includes a fiber optic output window having an inside vacuum surface and an outside surface with said phosphor screen being deposited upon the inside vacuum surface of said window, and said surface of said transparent plate bearing said graticule pattern being separated from the outside surface of said window by a gap of uniform width, said gap being dimensioned to preclude optical contact between the plate and to substantially preclude parallax between the output image and the graticule.

4. A graticule illumination system as claimed in claim 3, wherein said gap is greater than half the wavelength of the light of longest wavelength of said first and second colors.

5. A graticule illumination system as claimed in claim 4, wherein said gap is substantially 50 microns.

6. A graticule illumination system as claimed in claim 1 wherein said graticule illuminating means include means for injecting light of the second color into the transparent plate at the edge of the plate, the surfaces of said plate being adapted to spread said injected light inside the plate by repeated total internal reflection at the plate surfaces, light being scattered out of the plate by the pattern.

7. A graticule illumination system as in claim 1, wherein the surfaces of the transparent plate are polished to permit total internal reflection of light injected from the edges, the plate being spaced from the screen on which the output image is displayed.

* * * * *